(12) United States Patent
Matsunaga et al.

(10) Patent No.: US 12,225,436 B2
(45) Date of Patent: Feb. 11, 2025

(54) SENSOR SYSTEM, WIRELESS COOPERATIVE RECEIVING SYSTEM, AND WIRELESS COOPERATIVE RECEIVING METHOD

(71) Applicant: Nippon Telegraph and Telephone Corporation, Tokyo (JP)

(72) Inventors: Kenichi Matsunaga, Tokyo (JP); Takayuki Ogasawara, Tokyo (JP); Hiroyoshi Togo, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 461 days.

(21) Appl. No.: 17/776,194

(22) PCT Filed: Nov. 18, 2019

(86) PCT No.: PCT/JP2019/045058
§ 371 (c)(1),
(2) Date: May 11, 2022

(87) PCT Pub. No.: WO2021/100081
PCT Pub. Date: May 27, 2021

(65) Prior Publication Data
US 2022/0394438 A1 Dec. 8, 2022

(51) Int. Cl.
*H04W 4/38* (2018.01)
*H04W 4/80* (2018.01)
(Continued)

(52) U.S. Cl.
CPC ............... *H04W 4/38* (2018.02); *H04W 4/80* (2018.02); *H04W 36/033* (2023.05); *H04W 88/04* (2013.01)

(58) Field of Classification Search
CPC ....... H04W 4/80; H04W 84/18; H04W 76/10; H04W 88/04; H04W 76/14; H04W 8/005;
(Continued)

(56) References Cited

U.S. PATENT DOCUMENTS 9,265,080 B1 * 2/2016 Palin ..................... H04W 76/15
9,338,638 B1 * 5/2016 Palin ..................... H04W 12/37
(Continued)

OTHER PUBLICATIONS

Bluetooth SIG, "Bluetooth Core Specification v5.1", Bluetooth SIG Proprietary, Jan. 21, 2019, https://3pl46c46ctx02p7rzdsvsg21-wpengine.netdna-ssl.com/wp-content/uploads/2019/03/1901_Feature_Overview_Brief_FINAL.pdf, 2985 pages.

(Continued)

*Primary Examiner* — Khalid W Shaheed
(74) *Attorney, Agent, or Firm* — Slater Matsil, LLP

(57) ABSTRACT

Each of relay terminals transmits a wireless packet received from a wireless sensor and a reception strength of Bluetooth wireless communication to a control device using a first HCI packet, and returns a response to the wireless packet to a source wireless sensor, which is a source of the wireless packet, only when a second HCI packet is received from the control device. The control device compares the reception strengths, among the reception strengths received through the first HCI packets from the relay terminals, that pertain to the same packet transmitted from the same wireless sensor and received by the plurality of relay terminals, transmits the second HCI packet only to one target relay terminal having the highest reception strength, and relays the sensor data stored in the target relay device to a host device.

9 Claims, 9 Drawing Sheets

(51) Int. Cl.
*H04W 36/00* (2009.01)
*H04W 88/04* (2009.01)

(58) Field of Classification Search
CPC ..... H04W 84/20; H04W 88/06; H04W 48/16; H04W 92/02; H04W 36/033; H04W 12/47; H04W 12/50; H04W 28/065; H04W 72/12
See application file for complete search history.

(56) References Cited

U.S. PATENT DOCUMENTS

| | | | | |
|---|---|---|---|---|
| 2016/0007181 A1* | 1/2016 | Palin | .................... | H04B 17/318 |
| | | | | 455/41.2 |
| 2016/0134709 A1* | 5/2016 | Savolainen | ........... | H04W 8/005 |
| | | | | 370/338 |
| 2016/0381637 A1* | 12/2016 | Kvetny | ................... | H04L 67/56 |
| | | | | 370/311 |
| 2017/0372600 A1* | 12/2017 | Palin | ....................... | H04W 4/80 |

OTHER PUBLICATIONS

Matsunaga et al., "Proposal of Multi-Sensor Data Collection Technology Suitable for IoT, IoT gateway technology for connecting various sensors," 2016 Communications Society Conference of the Institute of Electronics, Information and Communications Technology, 2016, 3 pages.

Ogasawara et al., "Application for Rehabilitation Medicine Using Wearable Textile "hitoe"", NTT Technical Review, vol. 16, No. Sep. 9, 2018, pp. 6-12.

* cited by examiner

SENSOR SYSTEM, WIRELESS COOPERATIVE RECEIVING SYSTEM, AND WIRELESS COOPERATIVE RECEIVING METHOD

CROSS-REFERENCE TO RELATED APPLICATIONS

This application is a national phase entry of PCT Application No. PCT/JP2019/045058, filed on Nov. 18, 2019, which application is hereby incorporated herein by reference.

TECHNICAL FIELD

The present invention relates to a wireless cooperative reception technique in which, in a sensor system containing a large number of wireless sensors, packets transmitted from the wireless sensors are received cooperatively among a plurality of relay terminals.

BACKGROUND

In an IoT (Internet of Things)-based society, where all things are connected to the Internet, it is expected that a sensor system containing various types of wireless sensors in a network (a multi-sensor system) will be used to extract useful information by collecting a large amount of sensor data obtained by the wireless sensors in a host device such as a server and analyzing the sensor data (see, for example, NPL 1).

FIG. 9 is a diagram illustrating the configuration of a typical sensor system. FIG. 9 illustrates an example of the configuration of a typical sensor system in which a large number of wireless sensors are connected to a gateway by a wireless communication system, and are connected to a host device, constituted by a group of servers, from the gateway via a communication network.

In order for such a large number of wireless sensors to function as part of a sensor system, it is essential for wireless packets from wireless sensors holding sensor data are accurately received by the wireless communication system. On the other hand, many wireless sensors use a short-range wireless communication method that emphasizes low power in order to achieve long battery operation (see, for example, NPL 2). As a result, the output power of the stated short-range wireless communication method is lower than that of wireless communication methods such as 3G (third Generation Mobile Communication System)/LTE (Long Term Evolution), Wi-Fi, and the like.

The short wireless communication range of a wireless sensor resulting from such low output power can be covered by, for example, having a wireless terminal such as a smartphone carried by a user wearing a wireless sensor function as a relay terminal, receiving sensor data from the wireless sensor and relaying the sensor data to a host device.

Using such a wireless sensor having low output power to measure biometric data twenty-four hours a day shows promise for use in physical condition management, medical applications, and the like (see, for example, NPL 3 and the like).

CITATION LIST

Non Patent Literature

[NPL 1] Matsunaga et al, "Proposal of multi-sensor containment data collection technique suited to IoT", 2016 IEICE Society Conference B-18-56

[NPL 2] "Bluetooth Core Specification v5.1", Bluetooth, Internet: https://3pl46c46ctx02p7rzdsvsg21-wpengine.netdna-ssl.com/wp-content/uploads/2019/03/1901_Feature_Overview_Brief_FINAL.pdf, 28 Jan. 2019

[NPL 3] T. Ogasawara et al, "Application for Rehabilitation Medicine Using Wearable Textile 'hitoe'", NTT Technical review, vol. 16, No. 9, pp. 6-12, September 2018.

SUMMARY

Technical Problem

In a sensor system such as that illustrated in FIG. 9, when a wireless packet containing sensor data is transmitted from a wireless sensor and received by a plurality of relay terminals in a wireless communication system, the wireless communication may be cut off on the wireless sensor side if responses to the transmitted wireless packet are returned from a plurality of relay terminals. Therefore, in order to receive and collect sensor data without interruption, it is necessary to consider the cooperative handover of wireless sensors between relay terminals.

However, a short-range wireless communication method is basically intended to realize one-to-one communication simply and with low power, and therefore does not have a function for making handovers between relay terminals as realized in 3G/LTE. There is thus a problem in that wireless communication is always cut off during a handover between relay terminals, and in some cases, the sensor data may be interrupted. This is not a particular problem for sensor data where low-speed sampling of about 1 Hz or less is sufficient, such as heart rate, but becomes a major problem for sensor data that requires high-speed sampling, such as acceleration data and ECG data.

One possible solution to this problem is to provide the wireless sensor with two short-range wireless communication modules, and if the modules are connected to mutually-different relay terminals, one of the modules will connect to the relay terminal having better communication conditions. However, this method depends on the circuit configuration of the wireless sensor, and is therefore not applicable to all wireless sensors. In addition, there is demand for wireless sensors to be inexpensive, and installing two short-range wireless communication modules in a wireless sensor runs contrary to this demand and is therefore undesirable.

Thus, the use of short-range wireless communication methods in wireless sensors has advantages in terms of versatility and low cost, but problems such as those described above arise when considering applications such as the cooperative reception envisioned by IoT systems.

Having been achieved to solve such problems, embodiments of the present invention provide a wireless cooperative reception technique that enables a plurality of relay terminals to cooperatively receive a wireless packet transmitted using short-range wireless communication.

Means for Solving the Problem

To achieve the stated object, a sensor system according to embodiments of the present invention includes: one or more wireless sensors that store, in a wireless packet, sensor data that has been detected, and transmit the wireless packet using Bluetooth wireless communication; a plurality of relay terminals, each relay terminal receiving the wireless packet transmitted from the one or more wireless sensors; and a control device that is connected to the plurality of relay terminals by a communication line and that controls an operation of receiving the wireless packet in the plurality of relay terminals. Each of the plurality of relay terminals stores the wireless packet received from the one or more wireless sensors and a reception strength of the Bluetooth wireless communication detected when the wireless packet is received in a first HCI packet and transmits the first HCI packet to the control device, and returns a response to the wireless packet to a source wireless sensor that is the source of the wireless packet only when a second HCI packet is received from the control device. The control device compares the reception strengths, among the reception strengths received through the first HCI packets from the plurality of relay terminals, that pertain to the same wireless packet transmitted from the same wireless sensor and received by each of the plurality of relay terminals, transmits the second HCI packet to only one target relay terminal having the highest reception strength, and relays the sensor data stored in the wireless packet received by the target relay terminal to the host device.

Additionally, a wireless cooperative reception system according to embodiments of the present invention includes: a plurality of relay terminals, each relay terminal receiving a wireless packet transmitted from one or more wireless sensors using Bluetooth wireless communication; and a control device that is connected to the plurality of relay terminals by a communication line and that controls an operation of receiving the wireless packet in the plurality of relay terminals. Each of the plurality of relay terminals detects a reception strength pertaining to the Bluetooth wireless communication when the wireless packet is received, stores the reception strength in a first HCI packet and transmits the first HCI packet to the control device, and returns a response to the wireless packet to a source wireless terminal that is a source of the wireless packet only when a second HCI packet is received from the control device. The control device compares the reception strengths, among the reception strengths received through the first HCI packets from the plurality of relay terminals, that pertain to the same wireless packet transmitted from the same wireless terminal and received by each of the plurality of relay terminals, and transmits the second HCI packet only to one target relay terminal having the highest reception strength.

Additionally, a wireless cooperative reception method according to embodiments of the present invention is a wireless cooperative reception method used in a wireless cooperative reception system including a plurality of relay terminals and a control device connected to the plurality of relay terminals over a communication line. The method includes: a reception step of each of the plurality of relay terminals receiving a wireless packet transmitted from one or more wireless sensors using Bluetooth wireless communication; and a control step of the control device controlling a reception operation of the wireless packet in each of the plurality of relay terminals. The reception step includes a step of detecting a reception strength pertaining to the Bluetooth wireless communication when the wireless packet is received, storing the reception strength in a first HCI packet, and transmitting the first HCI packet to the control device, and a step of returning a response to the wireless packet to a source wireless sensor that is a source of the wireless packet only when a second HCI packet is received from the control device. The control step includes a step of comparing the reception strengths, among the reception strengths received through the first HCI packets from the plurality of relay terminals, that pertain to the same wireless packet transmitted from the same wireless terminal and received by each of the plurality of relay terminals, and transmitting the second HCI packet only to one target relay terminal having the highest reception strength.

Effects of Embodiments of the Invention

According to embodiments of the present invention, a plurality of relay terminals can cooperatively receive a wireless packet transmitted using Bluetooth wireless communication, which is one example of short-range wireless communication, and thus when embodiments of the present invention is applied in a sensor system, sensor data transmitted in wireless packets from a wireless sensor can be received and collected without interruption.

DESCRIPTION OF ILLUSTRATIVE EMBODIMENTS

Embodiments of the present invention will be described next with reference to the drawings.

First Embodiment

Figure 1:
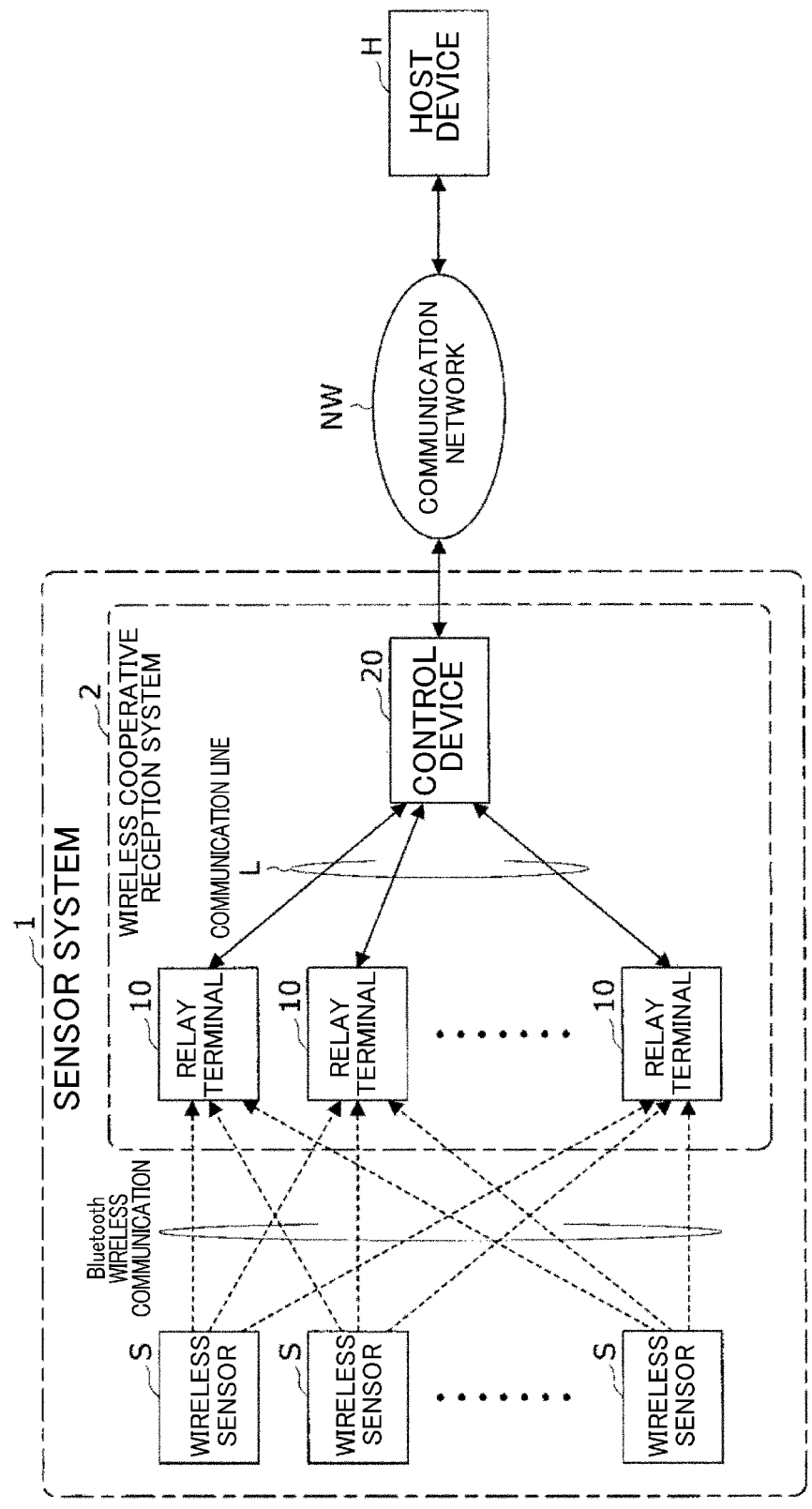
FIG. 1 is a block diagram illustrating the configuration of a sensor system according to a first embodiment.

First, a sensor system 1 according to a first embodiment of the present invention will be described with reference to FIG. 1. FIG. 1 is a block diagram illustrating the configuration of the sensor system according to the first embodiment.

Sensor System

As illustrated in FIG. 1, the sensor system 1 is a system in which sensor data detected by one or more wireless sensors S is stored in wireless packets which are transmitted by Bluetooth (registered trademark) wireless communication, which is an example of short-range wireless communication; the wireless packets are received by a plurality of relay terminals 10; the wireless packets are transmitted to a single control device 20 over a communication line L; and the sensor data stored in the received wireless packets is relayed and collected from the control device 20 to a host device H over a communication network NW.

The following will describe, as an example, a case where the wireless sensor S is a wearable sensor that is worn on the body of a user to detect biometric data, and the user's biometric data is collected by the sensor system 1.

In FIG. 1, the relay terminals 10 and the control device 20 constitute a wireless cooperative reception system 2. The wireless cooperative reception system 2 is a wireless communication system in which the wireless packets from the one or more wireless sensors S are received cooperatively by the relay terminals 10, and are relayed to the host device H over the communication network NW.

Principles of Embodiments of Invention

Principles of embodiments of the present invention will be described next. As described earlier, when a wireless packet storing sensor data is transmitted from a wireless sensor S and received by a plurality of relay terminals 10, the wireless communication may be cut off on the wireless sensor S side if responses to the transmitted wireless packet are returned from the plurality of relay terminals 10. A key point in addressing this issue is how to solve such inconveniences that occur when there are a plurality of relay terminals 10.

As an example, looking at the "Low Energy Controller volume" in NPL 2, the procedure is defined in which when a Link Layer (LL) packet is received from a transmitting side, the receiving side returns an LL Ack (response). If this LL Ack is not returned, the wireless connection is cut off on the transmitting side. On the other hand, when a plurality of LL Acks are returned, the transmitting side has not defined how to operate for such unexpected operations. If there is no definition, the wireless connection may be cut off on the transmitting side, and it is therefore necessary to configure the receiving side to cooperate and always return one LL Ack from any one receiving side in response to one LL packet from the transmitting side.

NPL 2 describes the basic technical specifications for Bluetooth wireless communication, which is one example of a short-range wireless communication method. The "Core System Package" thereof defines HCI (Host Controller Interface) as a control protocol, and what are known as HCI packets, which conform to this HCI protocol, are used when controlling a Bluetooth-side controller from a host such as a PC. Embodiments of the present invention focus on this HCI, and uses Bluetooth wireless communication as a short-range wireless communication method between the wireless sensors S and the relay terminals 10, and also uses HCI packets exchanged between the relay terminals 10 and the control device 20 to realize cooperative reception of wireless packets among the relay terminals 10.

More specifically, in embodiments of the present invention, each of the relay terminals 10 detects a reception strength of the Bluetooth wireless communication with the wireless sensors S when receiving a wireless packet. The control device 20 compares the reception strengths, among the reception strengths communicated by first HCI packets from the wireless sensors S, that pertain to the same wireless packet transmitted from the same wireless sensor S and received by each of the relay terminals 10, and transmits a response instruction in a second HCI packet to the relay terminal 10 having the highest reception strength. The relay terminal 10 that has received the second HCI packet returns a response pertaining to the received wireless packet to the source wireless sensor S. This enables a configuration in which a single response is returned, only to the one relay terminal 10 having the highest reception strength, in response to a single wireless packet transmitted from the wireless sensor S. It is therefore possible to realize cooperative reception of wireless packets among the relay terminals 10.

Wireless Sensor

The wireless sensor S used in the sensor system 1 according to the present embodiment will be described next. The wireless sensor S is a sensor terminal constituted by a battery-powered IC chip that stores sensor data detected by an attached sensor in wireless packets and transmits the packets wirelessly using a short-range wireless communication method. A wearable sensor that detects biometric data such as cardiac potential, pulse waves, acceleration, body temperature, or the like is a specific example of the wireless sensor S. The wireless sensor S uses Bluetooth as the short-range wireless communication method. Although it is theoretically sufficient for there to be at least one wireless sensor S in the sensor system 1, the following will describe a case where a plurality of wireless sensors S are provided according to the actual application.

Relay Terminal

The relay terminal 10 used in the sensor system 1 according to the present embodiment will be described next. The relay terminal 10 is a wireless terminal that receives wireless packets transmitted wirelessly through Bluetooth from the plurality of wireless sensors S. A smartphone carried by a user, an IoT gate installed in a facility, and the like are specific examples of the relay terminal 10. Note that the relay terminal 10 basically works to receive sensor data, and may therefore be called a receiver.

Figure 2:
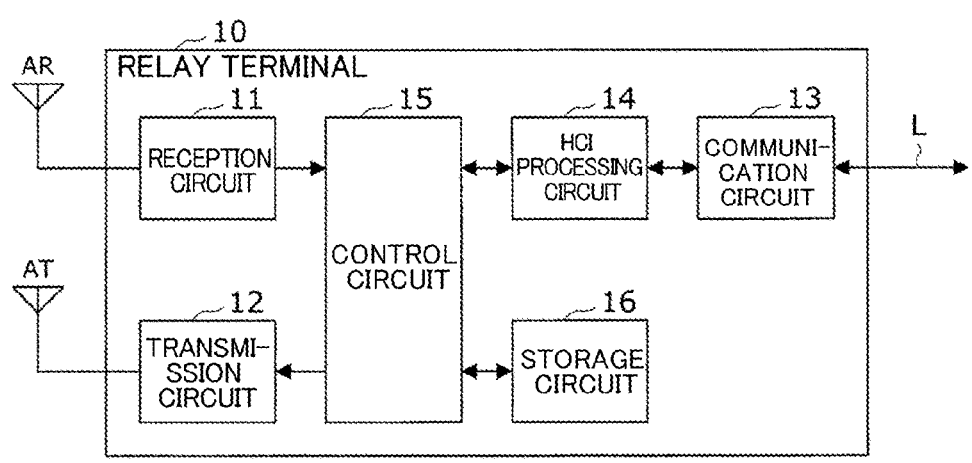
FIG. 2 is a block diagram illustrating the configuration of a relay terminal.

FIG. 2 is a block diagram illustrating the configuration of the relay terminal. As illustrated in FIG. 2, the relay terminal 10 includes the following as its primary circuit units: a reception antenna AR and a transmission antenna AT; a reception circuit 11, for short-range wireless communication, connected to the reception antenna AR; a transmission circuit 12, for short-range wireless communication, connected to the transmission antenna AT; a communication circuit 13 that performs data communication with the control device 20 over the communication line L; an HCI processing circuit 14; a control circuit 15; and a storage circuit 16.

The HCI processing circuit 14 is constituted by a signal processing circuit. The HCI processing circuit 14 stores an input wireless packet from the control circuit 15 and the reception strength in the first HCI packet, and transmits the first HCI packet from the communication circuit 13 to the control device 20, as well as outputting a response instruction to the control circuit 15 in accordance with the second HCI packet received from the control device 20 through the communication circuit 13. Appropriate packets from the HCI packets defined in HCI can be used as the first HCI packet and the second HCI packet. For example, an HCI packet that can store any data, such as an HCI ACL Data Packet, may be used as an example of the first HCI packet. An HCI packet that can designate various types of commands, such as an HCI Command Packet, may be used as an example of the second HCI packet.

The control circuit 15 as a whole is constituted by a Micro Controller Unit (MCU). By operating cooperatively with programs stored in internal memory, the storage circuit 16, and the like, the control circuit 15 performs relay processing operations for wireless packets, in which the wireless packet received by the reception circuit 11 and the reception strength pertaining to the wireless packet detected by the reception circuit 11 are output to the HCI processing circuit 14 as data addressed to the control device 20, and the return of responses, to the wireless packet, from the communication circuit 13 to the source wireless sensor S is temporarily stopped.

Then, the control circuit 15 returns a response from the transmission circuit 12 to the source wireless sensor S only when a response instruction is output from the HCI processing circuit 14 in response to the second HCI packet from the control device 20. The control circuit 15 stops the return of responses to the source wireless sensor S when the second HCI packet is not received from the control device 20 and the response instruction is not output from the HCI processing circuit 14.

The storage circuit 16 as a whole is constituted by semiconductor memory, and stores various types of processing data used by the control circuit 15, such as received wireless packets and reception strengths pertaining to the wireless packets, programs, and the like.

Although FIG. 2 illustrates a case where the reception antenna AR and the transmission antenna AT are provided separately as the antennas for short-range wireless communication, a transmission-reception antenna AX may be used instead of the stated antennas.

Figure 3:
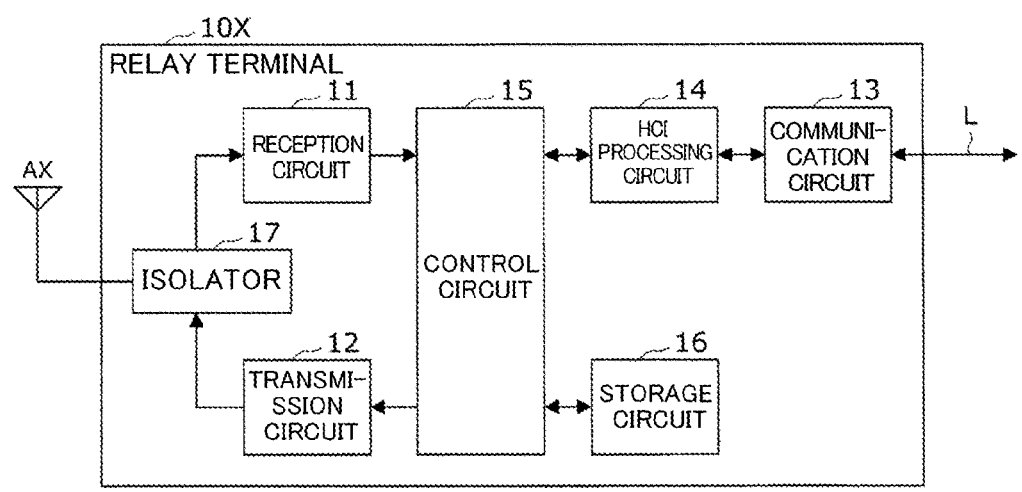
FIG. 3 is a block diagram illustrating another configuration of a relay terminal.

FIG. 3 is a block diagram illustrating another configuration of the relay terminal. A relay terminal 10X of FIG. 3 includes the transmission-reception antenna AX instead of the reception antenna AR and the transmission antenna AT of FIG. 2. An isolator 17, which blocks signals from moving from the transmitting side to the receiving side, is connected to the transmission-reception antenna AX, and the reception circuit 11 and the transmission circuit 12 for short-range wireless communication are connected to the isolator 17. The communication circuit 13 and the control circuit 15 are the same as in FIG. 2. According to this configuration, the relay terminal 10X can be configured using a single antenna, which is useful in terms of reducing costs.

Control Device

The control device 20 used in the sensor system 1 according to the present embodiment will be described next. The control device 20 is a communication control device that is connected to the plurality of relay terminals 10 over the communication line L and that controls wireless packet reception operations in the relay terminals 10. A gateway, a hub, a modem, a server device, and the like can be given as specific examples of the control device 20. The following will describe a case where the communication line L is constituted by a wired line such as a LAN as an example, but the communication line L is not limited thereto, and may be a wireless line such as a wireless LAN.

Figure 4:
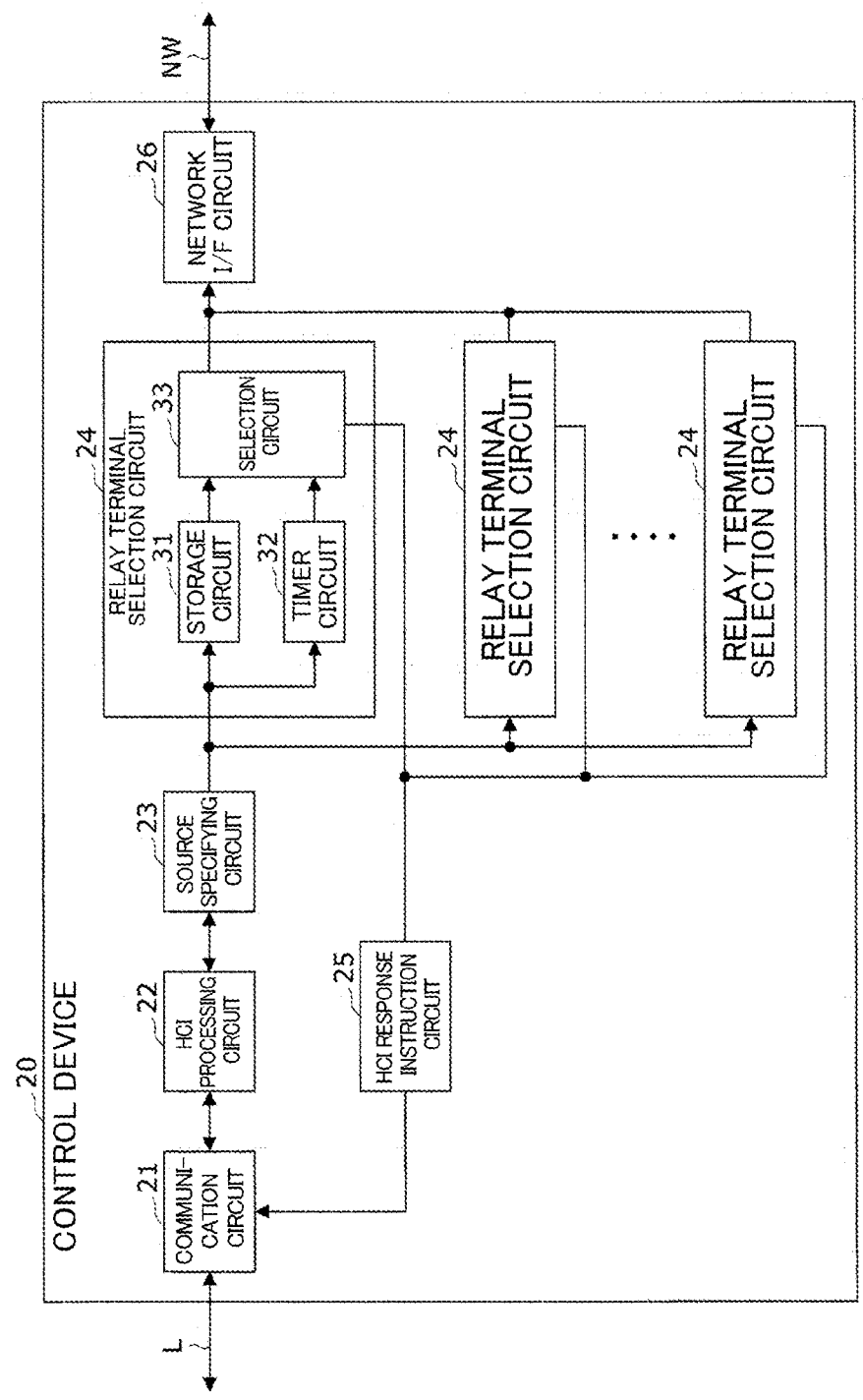
FIG. 4 is a block diagram illustrating the configuration of a control device according to the first embodiment.

FIG. 4 is a block diagram illustrating the configuration of the control device according to the first embodiment. As illustrated in FIG. 4, the control device 20 includes the following as its primary circuit units: a communication circuit 21; an HCI processing circuit 22; a source specifying circuit 23; a relay terminal selection circuit 24; an HCI response instruction circuit 25; and a network interface circuit (called a network I/F circuit hereinafter) 26.

The communication circuit 21 performs data communication with the plurality of relay terminals 10 over the communication line L.

The HCI processing circuit 22 obtains the wireless packet and the reception strength stored in the first HCI packet received from the relay terminals 10 through the communication circuit 21.

On the basis of a wireless packet obtained by the HCI processing circuit 22, the source specifying circuit 23 extracts an address, identification information, or the like of the wireless sensor S that is the source of the wireless packet, and as a result, specifies the source wireless sensor S of that wireless packet.

The relay terminal selection circuit 24 compares the reception strengths, among the reception strengths obtained by the HCI processing circuit 22, that pertain to the same wireless packet transmitted from the same wireless sensor S and received by each of the plurality of relay terminals 10, and selects the relay terminal 10 having the highest reception strength as a target relay terminal. The configuration of the relay terminal selection circuit 24 will be described in detail later. Note that the relay terminal selection circuit 24 temporarily stores the wireless packet received from each relay terminal 10, the reception strength, and so on as a packet list, and may therefore be called a wireless packet list circuit.

The HCI response instruction circuit 25 generates the second HCI packet indicating the response instruction for the target relay terminal selected by the relay terminal selection circuit 24, and transmits the second HCI packet to the target relay terminal from the communication circuit 21.

The network I/F circuit 26 relays the sensor data stored in the wireless packet received through the first HCI packet from the target relay terminal to the host device H via a communication network (higher-level network) NW such as the Internet. A server device, a cloud system, or the like that analyzes or uses sensor data such as biometric data is a specific example of the host device H.

Relay Terminal Selection Circuit

The aforementioned relay terminal selection circuit 24 used in the control device 20 of the sensor system 1 according to the present embodiment will be described in detail next with reference to FIG. 4.

As illustrated in FIG. 4, a plurality of the relay terminal selection circuits 24 are connected in parallel to the source specifying circuit 23. The purpose of this configuration is to receive wireless packets from different wireless sensors S at overlapping timings and process the wireless packets in parallel.

In this configuration, the source specifying circuit 23 outputs, to the relay terminal selection circuit 24 corresponding to the specified source wireless sensor S, a plurality of wireless packets transmitted from the source wireless sensor S and received by each of the plurality of relay terminals 10, and a plurality of reception strengths pertaining to the stated plurality of wireless packets.

Additionally, the relay terminal selection circuit 24 stores the plurality of wireless packets output from the source specifying circuit 23 and the plurality of reception strengths, compares the plurality of reception strengths, and selects the relay terminal 10 having the highest reception strength among the plurality of relay terminals 10 as the target relay terminal.

Each of the relay terminal selection circuits 24 includes the following as its primary circuit units: a storage circuit 31; a timer circuit 32; and a selection circuit 33. The storage circuit 31 as a whole is constituted by a storage device such as semiconductor memory, and sequentially stores, as a packet list, the plurality of wireless packets output from the source specifying circuit 23 and the plurality of reception strengths.

The timer circuit 32 as a whole is constituted by a timer circuit such as a countdown timer that operates using a clock signal, and measures a standby period of a set length of time from a reception timing of the first HCI packet received from the source wireless sensor S specified by the source specifying circuit 23.

The selection circuit 33, upon the standby period measured by the timer circuit 32 ending, compares the plurality of reception strengths stored in the storage circuit 31 during the standby period, and selects the relay terminal i having the highest reception strength among the plurality of relay terminals i as the target relay terminal.

The number of the relay terminal selection circuits 24 provided in the control device 20 corresponds to the number of wireless packets transmitted in parallel from different wireless sensors S, and the maximum value thereof is equal to the total number of wireless sensors S. However, the number of relay terminal selection circuits 24 depends on the application to which the sensor system 1 is applied, and the number of relay terminal selection circuits 24 can be set lower than the total number of wireless sensors S when the number of wireless sensors S which transmit wireless packets almost simultaneously is lower than the total number.

Additionally, the relay terminal selection circuits 24 can be implemented with an extremely simple configuration as described earlier, and thus many relay terminal selection circuits 24 can be installed in the control device 20. This means that a large number of wireless sensors S can be processed by the control device 20, which can be said to be more suited to IoT systems than general short-range wireless systems where the number of connections is limited by the IC chip used.

Sensor Data Collection Operations

Figure 5:
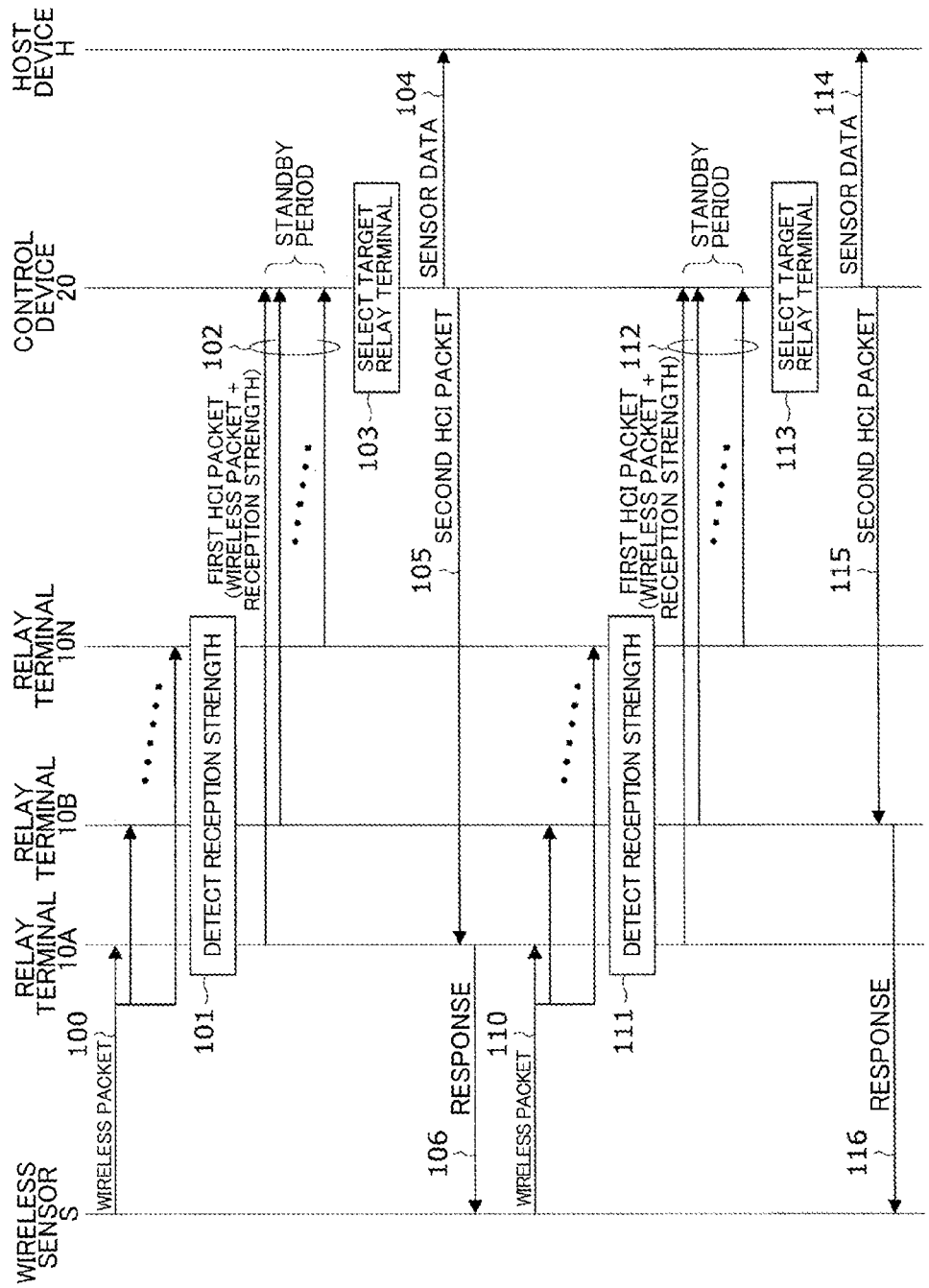
FIG. 5 is a sequence chart illustrating sensor data collection operations of the sensor system.

Next, sensor data collection operations performed by the sensor system 1 according to the present embodiment will be described with reference to FIG. 5. FIG. 5 is a sequence chart illustrating sensor data collection operations of the sensor system.

FIG. 5 illustrates a situation where relay terminals 10A, 10B, . . . , 10N are provided as the relay terminals 10 of the sensor system 1, and all of the relay terminals 10A, 10B, . . . , 10N receive the wireless packets transmitted from a single wireless sensor S, but the configuration is not limited thereto.

In practice, one or more of the relay terminals 10A, 10B, . . . , 10N capable of short-range wireless communication with the wireless sensor S receive the wireless packets, depending on the positional relationships between the wireless sensor S and the relay terminals 10A, 10B, . . . , 10N, and the relay terminal 10 having the maximum reception strength among the relay terminals 10 that have received the wireless packets is selected by the control device 20 as the target relay terminal.

First, a wireless packet storing sensor data is transmitted from the wireless sensor S through short-range wireless communication (step S100), and is received by the relay terminals 10A, 10B, . . . , 10N. Each of the relay terminals 10A, 10B, . . . , 10N detects the reception strength of the short-range wireless communication when receiving the wireless packet (step S101), stores the wireless packet and the reception strength in the first HCI packet, and transmits the first HCI packet to the control device 20 (step S102).

The control device 20 receives the wireless packet and the reception strength from the relay terminals 10A, 10B, . . . , 10N through the first HCI packet, and selects the relay terminal 10 having the highest reception strength among the relay terminals 10A, 10B, . . . , 10N, which in this example is the relay terminal 10A, as the target relay terminal (step S103).

After this, the control device 20 relays the sensor data stored in the wireless packet received through the first HCI packet from the relay terminal 10A, which is the target relay terminal, to the host device H over the communication network NW (step S104).

Additionally, the control device 20 generates the second HCI packet which makes a response instruction to the wireless sensor S, and transmits the second HCI packet to the relay terminal 10A, which is the target relay terminal, over the communication line L (step S105).

In response to the second HCI packet from the control device 20, the relay terminal 10A returns a response corresponding to the received wireless packet to the wireless sensor S that is the source (step S106). At this time, the second HCI packet is not transmitted from the control device 20 to the relay terminals 10B, . . . , 10N aside from the relay terminal 10A, and therefore do not return a response corresponding to the received wireless packet to the wireless sensor S that is the source.

Through this, only a response from the relay terminal 10A, which is the target relay terminal, is returned to the wireless sensor S, even if the plurality of relay terminals 10A, 10B, . . . 10N have received the wireless packet from the wireless sensor S. In other words, even when a short-range wireless communication method is used, cooperative reception of the wireless packet transmitted from the wireless sensor S is realized among the relay terminals 10A, 10B, . . . , 10N.

Then, when a wireless packet storing new sensor data is transmitted from the wireless sensor S through short-range wireless communication (step S110), that wireless packet is received by the relay terminals 10A, 10B, . . . , 10N in the same manner. Each of the relay terminals 10A, 10B, . . . , 10N detects the reception strength of the short-range wireless communication when receiving the wireless packet (step S111), stores the wireless packet and the reception strength in the first HCI packet, and transmits the first HCI packet to the control device 20 (step S112).

The control device 20 receives the wireless packet and the reception strength from the relay terminals 10A, 10B, . . . , 10N through the first HCI packet, and selects the relay terminal 10 having the highest reception strength among the relay terminals 10A, 10B, . . . , 10N, which in this example is the relay terminal 10B, as the target relay terminal (step S113).

After this, the control device 20 relays the sensor data stored in the wireless packet received through the first HCI packet from the relay terminal 10B, which is the target relay terminal, to the host device H over the communication network NW (step S114).

Additionally, the control device 20 generates the second HCI packet which makes a response instruction to the wireless sensor S, and transmits the second HCI packet to the relay terminal 10B, which is the target relay terminal, over the communication line L (step S115).

In response to the second HCI packet from the control device 20, the relay terminal 10B returns a response corresponding to the received wireless packet to the wireless sensor S that is the source (step S116). At this time, the second HCI packet is not transmitted from the control device 20 to the relay terminals 10A, . . . , 10N aside from the relay terminal 10B, and therefore do not return a response corresponding to the received wireless packet to the wireless sensor S that is the source.

Through this, only a response from the relay terminal 10B, which is the target relay terminal, is returned to the wireless sensor S, even if the plurality of relay terminals 10A, 10B, . . . 10N have received the wireless packet from the wireless sensor S. In other words, even when a short-range wireless communication method is used, cooperative reception of the wireless packet transmitted from the wireless sensor S is realized among the relay terminals 10A, 10B, . . . , 10N.

By operating in this manner, a situation where the wireless communication is cut off on the wireless sensor S side, which can arise when a plurality of responses are returned to the wireless sensor S, can be avoided, and the sensor data can be received and collected without interruption as a result. Additionally, the relay terminal 10 having the highest reception strength is selected as the target relay terminal, and thus the sensor data of wireless packets received by the most reliable relay terminal 10 is collected even by wireless sensors S having low output power. This makes it possible to construct a highly-reliable sensor system 1. This method is particularly useful in BLE (Bluetooth Low Energy), where the maximum packet size is small, because there is little variation in the reception strength within a single packet.

Relay Terminal Selection Operations

Figure 6:
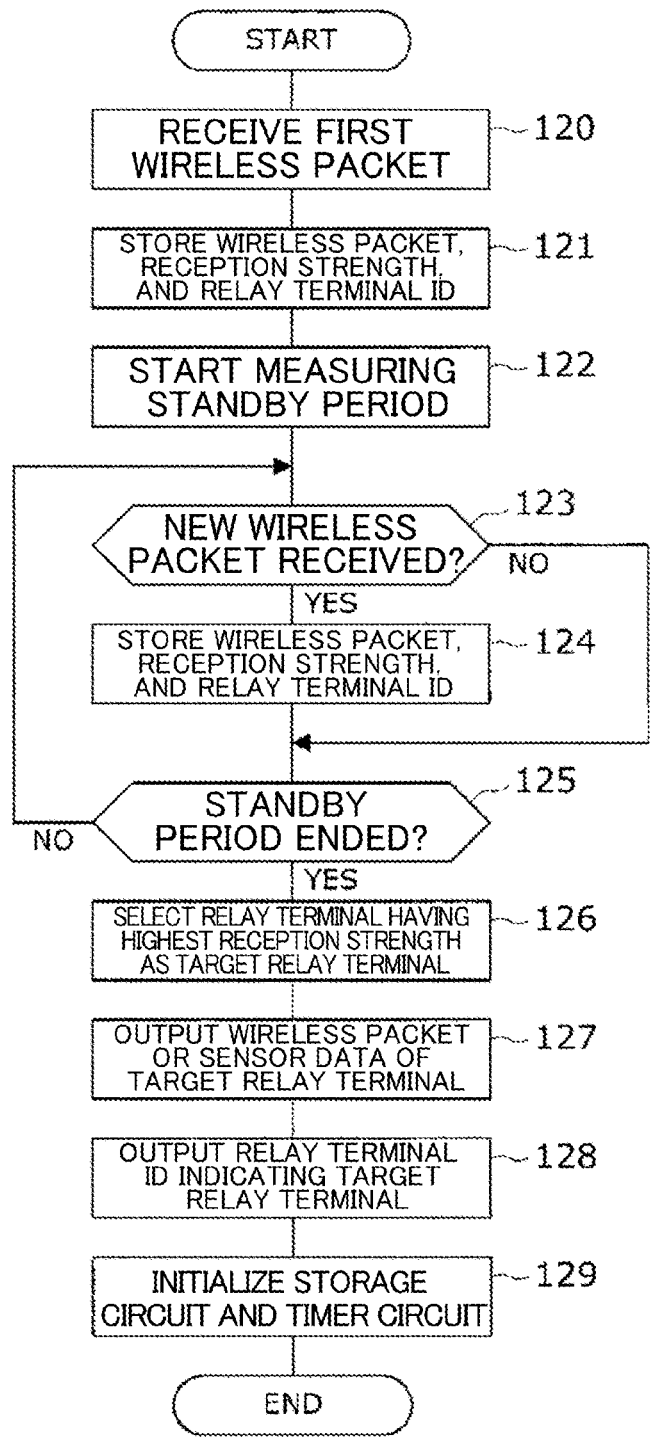
FIG. 6 is a flowchart illustrating relay terminal selection operations performed by the control device.

Relay terminal selection operations performed by the control device 20 of the sensor system 1 in the wireless cooperative reception method according to the present embodiment will be described next with reference to FIGS. 4 and 6. FIG. 6 is a flowchart illustrating the relay terminal selection operations performed by the control device. Note that the flowchart indicating the relay terminal selection operations in FIG. 6 is not limited to the sequence described hereinafter, and can be modified as appropriate in various ways of which a person skilled in the art can conceive.

FIG. 6 assumes that in the control device 20, the HCI processing circuit 22 obtains the wireless packet and the reception strength from the first HCI packet received by the communication circuit 21; and the source specifying circuit 23 specifies the source wireless sensor S from the wireless packet, and outputs, to the relay terminal selection circuit 24 corresponding to the source wireless sensor S, the wireless packet, the reception strength thereof, and a relay terminal ID indicating the relay terminal 10 that received that wireless packet. It is also assumed that at the start of the relay terminal selection operations, the storage circuit 31 is initialized to a clear state in which all stored packets are erased, and the timer circuit 32 is stopped.

First, the relay terminal selection circuit 24 obtains the first wireless packet, reception strength, and relay terminal ID output from the source specifying circuit 23 (step S120), and stores those items in the storage circuit 31 (step S121). Additionally, the relay terminal selection circuit 24 uses the timer circuit 32 to start measuring the standby period in accordance with a trigger signal which is output from the relay terminal selection circuit 24 and synchronized with the first wireless packet (step S122). The trigger signal may be generated by the relay terminal selection circuit 24 and input to the timer circuit 32 in response to, for example, the first wireless packet being stored from the state in which the storage circuit 31 is cleared.

Next, the relay terminal selection circuit 24 confirms whether a new wireless packet has been output from the source specifying circuit 23 (step S123), and if a new wireless packet has been output (step S123: YES), the new wireless packet, the reception strength, and the relay terminal ID are stored in the storage circuit 31 (step S124). The relay terminal selection circuit 24 then confirms that the standby period has ended using the timer circuit 32 (step S125). Note that in step S123, if a new wireless packet has not been output (step S123: NO), the relay terminal selection circuit 24 moves to step S125.

If in step S125 the standby period has not yet ended (step S125: NO), the sequence returns to step S123. Through this, after wireless packets transmitted from the same wireless sensor S are first received by a given relay terminal 10, wireless packets received by another relay terminal 1o within a set standby period are stored in the storage circuit 31. This standby period is for absorbing variations in the arrival time at which packets arrive at the control device 20 via the respective relay terminals 10, and is set to be shorter than the sampling period of the sensor data in the wireless sensor S.

If the standby period has ended in step S125 (step S125: YES), the relay terminal selection circuit 24 uses the selection circuit 33 to select, as the target relay terminal, the relay terminal ID of the wireless packet having the highest reception strength among the wireless packets stored in the storage circuit 31 (step S126).

Then, through the selection circuit 33, the relay terminal selection circuit 24 outputs the wireless packet of the target relay terminal or the sensor data stored in that wireless packet to the network I/F circuit 26 (step S127), outputs the relay terminal ID indicating the target relay terminal to the HCI response instruction circuit 25 (step S128), initializes the storage circuit 31 to the clear state and resets the counter value of the timer circuit 32 (step S129), and ends the series of relay terminal selection operations.

Effects of First Embodiment

In this manner, in the present embodiment, each relay terminal 10 stores a wireless packet received from the wireless sensor S and a reception strength of the Bluetooth wireless communication detected when the wireless packet is received in the first HCI packet and transmits the first HCI packet to the control device 20, and returns a response to the wireless packet to the source wireless sensor S, which is the source of the wireless packet, only when a second HCI packet is received from the control device 20; and the control device 20 compares the reception strengths, among the reception strengths received through the first HCI packets from the relay terminals 10, that pertain to the same wireless packet transmitted from the same wireless sensor S and received by each of the plurality of relay terminals 10, transmits the second HCI packet to only one target relay terminal having the highest reception strength, and relays the sensor data stored in the wireless packet received by the target relay terminal to the host device H.

Through this, only one response from the one target relay terminal is returned to the wireless sensor S, even if the plurality of relay terminals 10 have received the wireless packet transmitted from the wireless sensor S. In other words, even when Bluetooth wireless communication, which is one example of a short-range wireless communication method, is used, cooperative reception of the wireless packet transmitted from the wireless sensor S is realized among the relay terminals 10. Accordingly, a situation where the wireless communication is cut off on the wireless sensor S side, which can arise when a plurality of responses are returned to the wireless sensor S, can be avoided, and the sensor data can be received and collected without interruption as a result.

Additionally, the relay terminal 10 having the highest reception strength is selected as the target relay terminal, and thus the sensor data of wireless packets received by the most reliable relay terminal 10 can be collected even by wireless sensors S having low output power. This makes it possible to construct a highly-reliable sensor system 1. This method is particularly useful in BLE (Bluetooth Low Energy), where the maximum packet size is small, because there is little variation in the reception strength within a single packet.

Additionally, cooperative reception control data, such as wireless packets, reception sensitivities, response instructions to the wireless sensors S, and the like, is exchanged between the relay terminals 10 and the control device 20 using HCI, which is a control protocol for Bluetooth wireless communication; it is therefore not necessary to prepare a new method or configuration for exchanging the cooperative reception control data, which makes it possible to reduce design costs, product costs, and the like.

Additionally, in the present embodiment, each of the relay terminals 10 may be constituted by: a reception antenna AR and a transmission antenna AT; a reception circuit 11, for Bluetooth wireless communication, connected to the reception antenna AR; a transmission circuit 12, for Bluetooth wireless communication, connected to the transmission antenna AT; a communication circuit 13 that performs data communication with the control device 20 over the communication line L; an HCI processing circuit 14 that stores a wireless packet that has been input and the reception strength in the first HCI packet and transmits the first HCI packet from the communication circuit 13 to the control device 20, and outputs a response instruction when the second HCI packet is received from the control device 20 via the communication circuit 13; and a control circuit 15 that outputs, to the HCI processing circuit 14, the wireless packet received by the reception circuit 11 and the reception strength pertaining to the wireless packet detected by the reception circuit 11, and returns the response from the transmission circuit 12 to the source wireless sensor S in accordance with the response instruction from the HCI processing circuit 14. Through this, the relay terminal 10 can be configured using general circuits that realize Bluetooth wireless communication, which makes it possible to reduce the circuit scale and cost of the relay terminal 10.

Additionally, in the present embodiment, each of the relay terminals 10X may be constituted by: a transmission-reception antenna AX; an isolator 17 connected to the transmission-reception antenna AX; a reception circuit 11 and a transmission circuit 12, for Bluetooth wireless communication, that are connected to the transmission-reception antenna AX via the isolator 17; a communication circuit 13 that performs data communication with the control device 20 over the communication line L; an HCI processing circuit 14 that stores a wireless packet that has been input and the reception strength in the first HCI packet and transmits the first HCI packet from the communication circuit 13 to the control device 20, and outputs a response instruction when the second HCI packet is received from the control device 20 via the communication circuit 13; and a control circuit 15 that outputs, to the HCI processing circuit 14, the wireless packet received by the reception circuit 11 and the reception strength pertaining to the wireless packet detected by the reception circuit 11, and returns the response from the transmission circuit 12 to the source wireless sensor S in accordance with the response instruction from the HCI processing circuit 14. Through this, the relay terminal 10 can be configured using general circuits that realize Bluetooth wireless communication, and the relay terminal 10X can be configured using a single antenna, which makes it possible to reduce the circuit scale and cost of the relay terminal 10.

Additionally, in the present embodiment, the control device 20 may be constituted by: a communication circuit 21 that performs data communication with the plurality of relay terminals 10 over the communication line L; an HCI processing circuit 22 that obtains the wireless packet and the reception strength from the first HCI packet received by the communication circuit 21; a source specifying circuit 23 that specifies the source wireless sensor S pertaining to the wireless packet on the basis of the wireless packet obtained by the HCI processing circuit 22; a relay terminal selection circuit 24 that compares the reception strengths, among the reception strengths obtained by the HCI processing circuit 22, that pertain to the same wireless packet transmitted from the same wireless sensor S and received by each of the plurality of relay terminals 10, and selects the relay terminal 10 having the highest reception strength as the target relay terminal; an HCI response instruction circuit 25 that generates a second HCI packet for the target relay terminal and transmits the second HCI packet from the communication circuit 21 to the target relay terminal; and a network interface circuit 26 that relays, to the host device H, sensor data stored in the wireless packet transmitted from the target relay terminal.

More specifically, the control device 20 may include a plurality of the relay terminal selection circuits 24; the source specifying circuit 23 may output, to the relay terminal selection circuit 24, among the relay terminal selection circuits 24, that corresponds to the specified source wireless sensor S, a plurality of wireless packets sent from the specified source wireless sensor S and received by respective ones of plurality of relay terminals 10, and a plurality of reception strengths pertaining to corresponding ones of the plurality of wireless packets; and each of the relay terminal selection circuits 24 may store the plurality of wireless packets output from the source specifying circuit 23 and the plurality of reception strengths, compare the plurality of reception strengths, and select the relay terminal 10 having the highest reception strength among the plurality of relay terminals 10 as the target relay terminal.

Additionally, in the present embodiment, each of the relay terminal selection circuits 24 may be constituted by: a storage circuit 31 that stores the plurality of wireless packets output from the source specifying circuit 23 and the plurality of reception strengths; a timer circuit 32 that measures a standby period of a set length of time from a reception timing of a first wireless packet received from the source wireless sensor S that has been specified; and a selection circuit 33 that, upon the standby period ending, compares the plurality of reception strengths stored in the storage circuit 31 during the standby period, and selects the relay terminal 10 having the highest reception strength among the plurality of relay terminals 10 as the target relay terminal. Through this, the relay terminal selection circuit 24 can be implemented in the control device 20 with an extremely simply configuration, and thus many relay terminal selection circuits 24 can be implemented in the control device 20. This means that a large number of wireless sensors S can be processed by the control device 20, which can be said to be more suited to IoT systems than general short-range wireless systems where the number of connections is limited by the IC chip used.

Additionally, in the present embodiment, the HCI processing circuit 22, the source specifying circuit 23, the relay terminal selection circuit 24, and the HCI response instruction circuit 25 of the control device 20 may be implemented by hardware using a signal processing circuit. This provides an advantage, compared to a case where the functions of these circuit units are implemented by software, in that delay and power consumption can be reduced. In particular, in this sensor system 1, if the return of a response to the source wireless sensor S is delayed, there is a danger of mistakenly assuming that the wireless connection has been cut off on the wireless sensor S side and therefore cancelling the wireless connection with the relay terminal 10. Because the standby time for this response is different for each wireless sensor S, it is extremely useful to configure the hardware to expand the number of wireless sensors S that can be connected to this sensor system 1.

In this case, it is suitable to configure the HCI processing circuit 22, the source specifying circuit 23, the relay terminal selection circuit 24, and the HCI response instruction circuit 25 using an ASIC (Application Specific Integrated Circuit), an FPGA (Field Programmable Gate Array), or the like. The reason for this is that it is possible to use a low-cost FPGA with a small circuit scale when the number of users and wireless sensors S in the sensor system 1 is small, and conversely, to use a large-scale FPGA that can add many circuits when the number of users and wireless sensors is large. Although developing ASICs makes it possible to greatly reduce costs through large-scale production, the scale of the circuit is determined at the time of development, and it is therefore not possible to use different types of ASICs depending on the scale. Since IoT-related applications often require a small start, FPGAs, which can be used for different applications depending on the scale, are useful.

Second Embodiment

Figure 7:
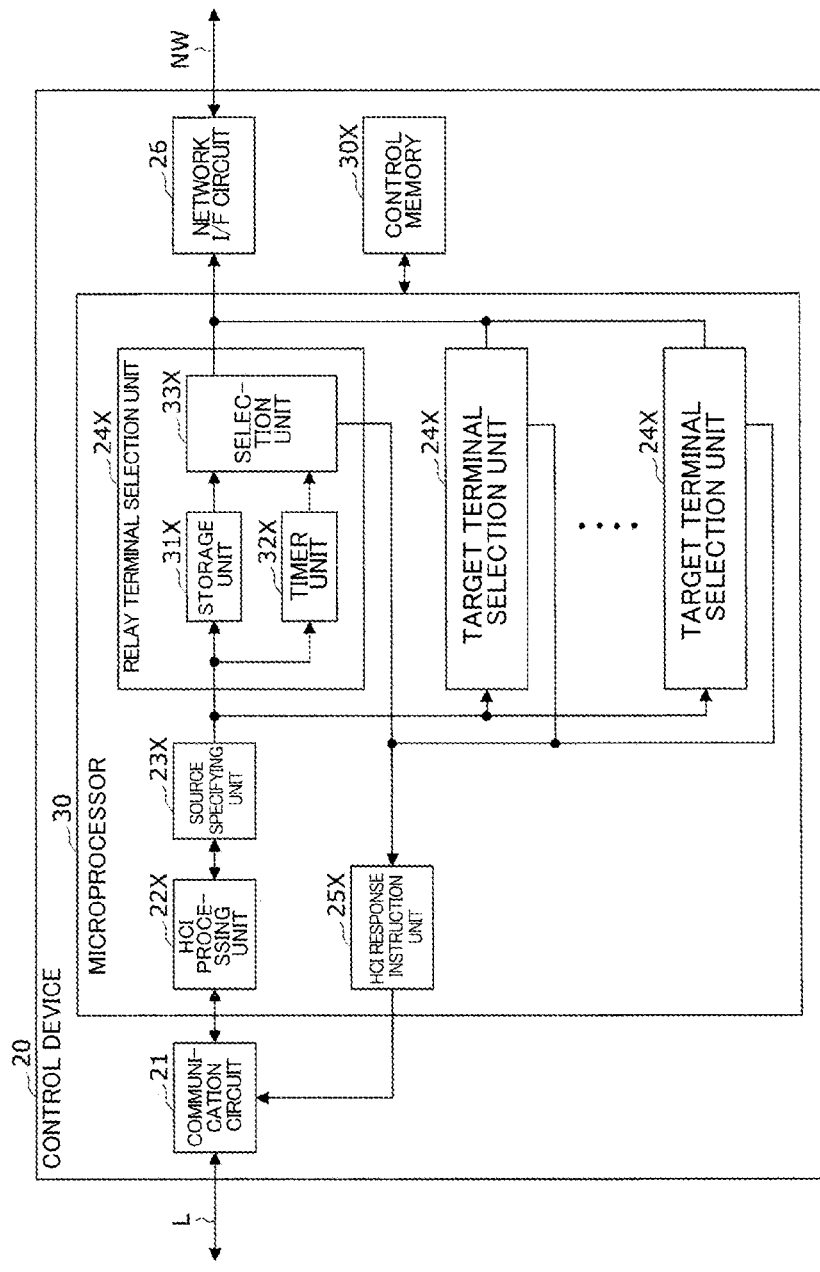
FIG. 7 is a block diagram illustrating the configuration of a control device according to a second embodiment.

Next, the control device 20 of the sensor system 1 according to a second embodiment of the present invention will be described with reference to FIG. 7. FIG. 7 is a block diagram illustrating the configuration of a control device according to the second embodiment.

Although FIG. 4, described earlier, illustrates a case where the HCI processing circuit 22, the source specifying circuit 23, the relay terminal selection circuits 24, and the HCI response instruction circuit 25 of the control device 20 are constituted by hardware, i.e., by dedicated circuit units, as an example, these items may be constituted by processing units using software.

FIG. 7 illustrates an example in which the control device 20 is constituted by the communication circuit 21, the network I/F circuit 26, a microprocessor 30, and control memory 30X. The microprocessor 30 realizes a computational processing unit for executing relay terminal control operations in the control device 20 by cooperating with programs (software) stored in the control memory 30X, which is constituted by semiconductor memory, or internal memory (not shown) in the microprocessor 30. An HCI processing unit 22X, a source specifying unit 23X, a relay terminal selection unit 24X, an HCI response instruction unit 25X, a storage unit 31X, a timer unit 32X, and a selection unit 33X are constituted by this computational processing unit.

The HCI processing unit 22X, the source specifying unit 23X, the relay terminal selection unit 24X, and the HCI response instruction unit 25X correspond to the HCI processing circuit 22, the source specifying circuit 23, the relay terminal selection circuits 24, and the HCI response instruction circuit 25, respectively, illustrated in FIG. 4. Additionally, the storage unit 31X, the timer unit 32X, and the selection unit 33X in the relay terminal selection unit 24X correspond to the storage circuit 31, the timer circuit 32, and the selection circuit 33 illustrated in FIG. 4.

Effects of Second Embodiment

Through this, the mounting area on a circuit board can be reduced compared to a case where the units are constituted by hardware, and thus effect increases with the number of users, wireless sensors S, and the like. The overall power consumption of the control device 20 can be suppressed as well.

Although FIG. 7 illustrates an example in which all of the HCI processing circuit 22, the source specifying circuit 23, the relay terminal selection circuits 24, and the HCI response instruction circuit 25 are constituted by the computational processing unit, the configuration is not limited thereto, and at least one of the HCI processing circuit 22, the source specifying circuit 23, the relay terminal selection circuits 24, and the HCI response instruction circuit 25 may be constituted by the computational processing unit.

Third Embodiment

Figure 8:
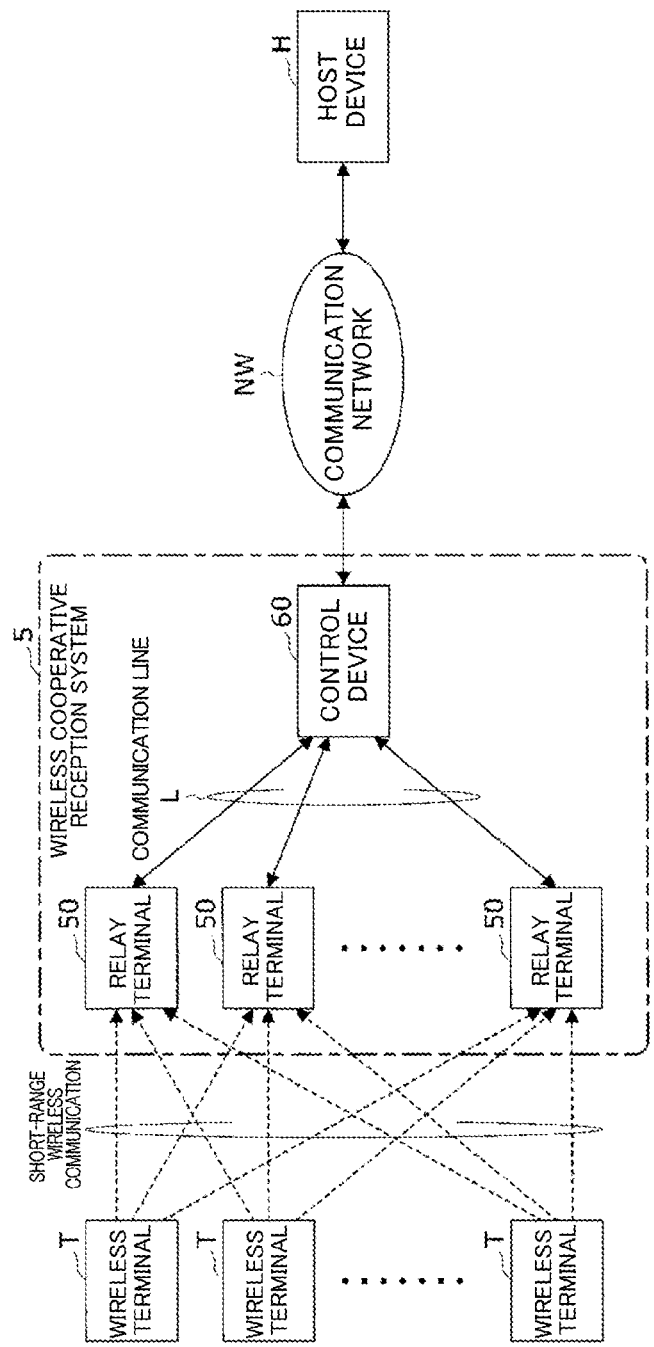
FIG. 8 is a block diagram illustrating the configuration of a wireless cooperative reception system according to a third embodiment.
Figure 9:
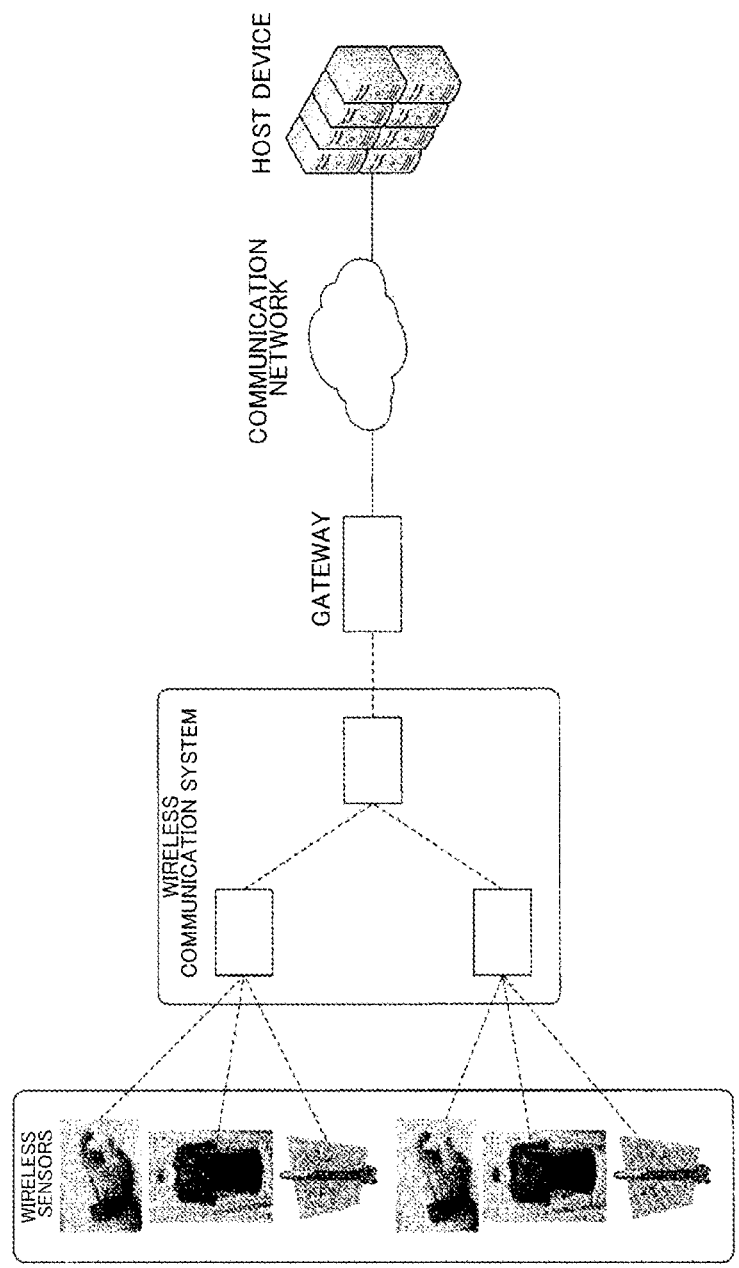
FIG. 9 is a diagram illustrating the configuration of a typical sensor system.

Next, a wireless cooperative reception system 5 according to a third embodiment of the present invention will be described with reference to FIG. 8. FIG. 8 is a block diagram illustrating the configuration of the wireless cooperative reception system according to the third embodiment.

Although FIG. 1 described earlier illustrates an example of an application in which the wireless cooperative reception system 2 is applied in the sensor system 1 and wireless packets storing sensor data are received from a plurality of wireless sensors S, the configuration is not limited thereto. As illustrated in FIG. 8, the wireless cooperative reception system 5 according to the present embodiment can be applied in a typical application in which wireless packets storing data aside from sensor data are received from wireless terminals T.

The wireless cooperative reception system 5 is constituted by a plurality of relay terminals 50 that perform short-range wireless communication with a plurality of wireless terminals T, and a single control device 60 that controls reception operations for wireless packets in the relay terminals 50. The configurations and operations of the relay terminals 50 and the control device 60 are the same as those of the relay terminals 10 and the control device 20 described earlier with reference to FIG. 1.

Each of the relay terminals 50 stores a wireless packet received from the wireless terminal T and a reception strength of the short-range wireless communication detected when the wireless packet is received in the first HCI packet, transmits the first HCI packet to the control device 60, and returns a response pertaining to the wireless packet to the source wireless terminal T, which is the source of the wireless packet, only when the second HCI packet is received from the control device 60.

The control device 60 compares the reception strengths, among the reception strengths received through the first HCI packets from the relay terminals 50, that pertain to the same wireless packet transmitted from the same wireless terminal T and received by each of the plurality of relay terminals 50, transmits the second HCI packet only to one target relay terminal having the highest reception strength, and relays the data stored in the wireless packet received by the target relay terminal to the host device H.

Effects of Third Embodiment

Through this, only one response from the one target relay terminal is returned to the wireless terminal T, even if the plurality of relay terminals 50 have received the wireless packet transmitted from the wireless terminal T. In other words, even when a short-range wireless communication method is used, cooperative reception of the wireless packet transmitted from the wireless terminal T is realized among the relay terminals 50. Accordingly, a situation where the wireless communication is cut off on the wireless terminal T side, which can arise when a plurality of responses are returned to the wireless terminal T, can be avoided, and the data can be received and collected without interruption as a result.

Additionally, the relay terminal 50 having the highest reception strength is selected as the target relay terminal, and thus the data of wireless packets received by the most reliable relay terminal 50 can be collected even by wireless terminals T having low output power. This makes it possible to construct a highly-reliable wireless system.

Extensions of Embodiments

While the present invention has been described above with reference to embodiments, the present invention is not intended to be limited to the above embodiments. Many variations can be made, by one of ordinary skill in the art, on the configuration and details of the present invention without departing from the scope of the present invention. Furthermore, the embodiments can be combined as desired as long as doing so does not produce any conflicts.

REFERENCE SIGNS LIST

1 Sensor system
2, 5 Wireless cooperative reception system
10, 50 Relay terminal
11 Reception circuit
12 Transmission circuit
13 Communication circuit
14 HCI processing circuit
15 Control circuit
16 Storage circuit
17 Isolator
20, 60 Control device
21 Communication circuit
22 HCI processing circuit
22X HCI processing unit
23 Source specifying circuit
23X Source specifying unit
24 Relay terminal selection circuit
24X Relay terminal selection unit
25 HCI response instruction circuit
25X HCI response instruction unit
26 Network I/F circuit (network interface circuit)
30 Microprocessor
30X Control memory
31 Storage circuit
31X Storage unit
32 Timer circuit
32X Timer unit
33 Selection circuit
33X Selection unit
S Wireless sensor
T Wireless terminal
AR Reception antenna
AT Transmission antenna
AX Transmission-reception antenna
L Communication line
NW Communication network
H Host device.

The invention claimed is:

1. A sensor system comprising:
one or more wireless sensors configured to store, in a wireless packet, sensor data that has been detected and transmit the wireless packet using Bluetooth wireless communication;
a plurality of relay terminals, each of the plurality of relay terminals configured to receive the wireless packet transmitted from the one or more wireless sensors; and
a control device connected to the plurality of relay terminals by a communication line and configured to control an operation of receiving the wireless packet in the plurality of relay terminals,
wherein each of the plurality of relay terminals is further configured to:
store the wireless packet received from the one or more wireless sensors and a reception strength of the Bluetooth wireless communication detected when the wireless packet is received in a first host controller interface (HCI) packet;
transmit the first HCI packet to the control device; and
return a response to the wireless packet to a source wireless sensor that is a source of the wireless packet only when a second HCI packet is received from the control device; and
wherein the control device is further configured to:
compare reception strengths received through first HCI packets from the plurality of relay terminals, that pertain to the wireless packet transmitted from a same wireless sensor of the one or more wireless sensors and received by each of the plurality of relay terminals;
transmit the second HCI packet to only one target relay terminal of the plurality of relay terminals having a highest reception strength among the reception strengths received through the first HCI packets; and
relay the sensor data stored in the wireless packet received by the target relay terminal to a host device.

2. The sensor system according to claim 1, wherein each of the relay terminals includes:
a reception antenna and a transmission antenna;
a reception circuit, for Bluetooth wireless communication, connected to the reception antenna and configured to receive the wireless packet;
a transmission circuit, for Bluetooth wireless communication, connected to the transmission antenna;
a communication circuit configured to perform data communication with the control device over the communication line;
an HCI processing circuit configured to store the wireless packet that has been input and the reception strength in the first HCI packet, transmit the first HCI packet from the communication circuit to the control device, and output a response instruction when the second HCI packet is received from the control device via the communication circuit; and
a control circuit configured to output, to the HCI processing circuit, the wireless packet received by the reception circuit and the reception strength pertaining to the wireless packet and return the response through the transmission circuit to the source wireless sensor in accordance with the response instruction from the HCI processing circuit.

3. The sensor system according to claim 1, wherein each of the relay terminals includes:
a transmission-reception antenna;
an isolator connected to the transmission-reception antenna;
a reception circuit and a transmission circuit, for Bluetooth wireless communication, that are connected to the transmission-reception antenna via the isolator, the reception circuit being configured to receive the wireless packet;
a communication circuit configured to perform data communication with the control device over the communication line;
an HCI processing circuit configured to store the wireless packet that has been input and the reception strength in the first HCI packet, transmit the first HCI packet from the communication circuit to the control device, and output a response instruction when the second HCI packet is received from the control device via the communication circuit; and
a control circuit configured to output, to the HCI processing circuit, the wireless packet received by the reception circuit and the reception strength pertaining to the wireless packet and return the response through the transmission circuit to the source wireless sensor in accordance with the response instruction from the HCI processing circuit.

4. The sensor system according to claim 1, wherein the control device comprises: a communication circuit configured to perform data communication with the plurality of relay terminals over the communication line; an HCI processing circuit configured to obtain the wireless packet and the reception strengths from the first HCI packets received by the communication circuit; a source specifying circuit configured to specify the source wireless sensor pertaining to the wireless packet on the basis of the wireless packet obtained by the HCI processing circuit; a relay terminal selection circuit configured to compare the reception strengths received through the first HCI packets from the plurality of relay terminals, that pertain to the wireless packet transmitted from the same wireless sensor of the one or more wireless sensors and received by each of the plurality of relay terminals; a response instruction circuit configured to generate the second HCI packet for the target relay terminal and transmit the second HCI packet through the communication circuit to the target relay terminal; and a network interface circuit configured to relay, to the host device, sensor data stored in the wireless packet received from the target relay terminal.

5. The sensor system according to claim 4, wherein:
the control device includes a plurality of relay terminal selection circuits, the plurality of relay terminal selection circuits comprising the relay terminal selection circuit,
the source specifying circuit is configured to output, to a first relay terminal selection circuit, among the plurality of relay terminal selection circuits, that corresponds to a specified source wireless sensor, a plurality of wireless packets sent from the specified source wireless sensor and received by respective ones of the plurality of relay terminals, and a plurality of reception strengths pertaining to corresponding ones of the plurality of wireless packets; and
each of plurality of the relay terminal selection circuits is configured to store the plurality of wireless packets output from the source specifying circuit and the plurality of reception strengths, compare the plurality of reception strengths, and select, the relay terminal having the highest reception strength among the plurality of relay terminals as the target relay terminal.

6. The sensor system according to claim 5, wherein each of the plurality of relay terminal selection circuits includes:
a storage circuit configured to store the plurality of wireless packets output from the source specifying circuit and the plurality of reception strengths;
a timer circuit configured to measure a standby period of a set length of time from a reception timing of a first wireless packet received from the source wireless sensor that has been specified; and
a selection circuit configured to, upon the standby period ending, compare the plurality of reception strengths stored in the storage circuit during the standby period and select the relay terminal having the highest reception strength among the plurality of relay terminals as the target relay terminal.

7. The sensor system according to claim 4, wherein the control device includes a microprocessor and control memory, and wherein at least one of the source specifying circuit, the relay terminal selection circuit, or the response instruction circuit is configured to operate cooperatively with a program stored in the control memory by the microprocessor.

8. A wireless cooperative reception system comprising:
a plurality of relay terminals, each of the plurality of relay terminals being configured to receive a wireless packet transmitted from one or more wireless terminals using Bluetooth wireless communication; and
a control device that is connected to the plurality of relay terminals by a communication line and that is configured to control an operation of receiving the wireless packet in the plurality of relay terminals;
wherein each of the plurality of relay terminals is further configured to:
detect a reception strength pertaining to the Bluetooth wireless communication when the wireless packet is received;
store the reception strength in a first HCI packet;
transmit the first HCI packet to the control device; and
return a response to the wireless packet to a source wireless terminal that is a source of the wireless packet only when a second HCI packet is received from the control device; and
wherein the control device is further configured to:
compare reception strengths received through first HCI packets from the plurality of relay terminals, that pertain to the wireless packet transmitted from a same wireless terminal of the one or more wireless terminals and received by each of the plurality of relay terminals; and
transmit the second HCI packet to only one target relay terminal of the plurality of relay terminals having a highest reception strength among the reception strengths received through the first HCI packets.

9. A wireless cooperative reception method used in a wireless cooperative reception system including a plurality of relay terminals and a control device connected to the plurality of relay terminals over a communication line, the method comprising:
a reception step, by each of the plurality of relay terminals, the reception step comprising receiving a wireless packet transmitted from one or more wireless terminals using Bluetooth wireless communication; and
a control step, by the control device, the control step comprising controlling a reception operation of the wireless packet in each of the plurality of relay terminals,
wherein the reception step further includes:
detecting a reception strength pertaining to the Bluetooth wireless communication when the wireless packet is received;
storing the reception strength in a first HCI packet;
transmitting the first HCI packet to the control device; and
returning a response to the wireless packet to a source wireless sensor that is a source of the wireless packet only when a second HCI packet is received from the control device, and wherein the control step further includes;
- comparing reception strengths received through first HCI packets from the plurality of relay terminals, that pertain to the wireless packet transmitted from a same wireless terminal of the one or more wireless terminals and received by each of the plurality of relay terminals; and
- transmitting the second HCI packet to only one target relay terminal of the plurality of relay terminals having a highest reception strength among the reception strengths received through the first HCI packets.

* * * * *